US012809482B2

(12) United States Patent
Shin et al.

(10) Patent No.: US 12,809,482 B2
(45) Date of Patent: Nov. 24, 2026

(54) DISPLAY APPARATUS FOR IMPROVING TOUCH NOISE

(71) Applicant: LG Display Co., Ltd., Seoul (KR)

(72) Inventors: Seung Hwan Shin, Paju-si (KR); Yong Hwa Park, Paju-si (KR); Dae Seok Oh, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/360,838

(22) Filed: Oct. 16, 2025

(65) Prior Publication Data

US 2026/0140590 A1 May 21, 2026

(30) Foreign Application Priority Data

Nov. 19, 2024 (KR) ........................ 10-2024-0165376

(51) Int. Cl.

*G06F 3/041* (2006.01)
*G09G 3/3266* (2016.01)
*G09G 3/3291* (2016.01)

(52) U.S. Cl.

CPC ....... *G06F 3/04182* (2019.05); *G09G 3/3266* (2013.01); *G09G 3/3291* (2013.01); *G09G 2310/027* (2013.01); *G09G 2310/08* (2013.01); *G09G 2320/0271* (2013.01); *G09G 2354/00* (2013.01)

(58) Field of Classification Search

None

See application file for complete search history.

(56) References Cited

U.S. PATENT DOCUMENTS

2017/0090621 A1* 3/2017 Kang .................... G06F 3/0412
2017/0344179 A1* 11/2017 Kim ..................... G09G 3/3677
2021/0191561 A1* 6/2021 Kim .................... G06F 3/04164
2022/0223091 A1* 7/2022 Chae .................... G09G 3/2007
2024/0085999 A1* 3/2024 Kim ...................... G06F 3/0412

FOREIGN PATENT DOCUMENTS

KR 10-2019-0059625 A 5/2019

* cited by examiner

*Primary Examiner* — Dorothy Harris

(74) *Attorney, Agent, or Firm* — Birch, Stewart, Kolasch & Birch, LLP

(57) ABSTRACT

A display apparatus can include a first display surface, a second display surface, a touch sensor array disposed to overlap the first and second display surfaces, a first gamma circuit configure to divide a first voltage difference between first high-level and low-level source voltages to generate first gamma reference voltages for the first display surface, and a second gamma circuit configure to divide a second voltage difference between second high-level and low-level source voltages to generate second gamma reference voltages for the second display surface. The first high-level and low-level source voltages are DC voltages in a first period of a frame and are AC voltages in a second period of the frame that succeeds the first period. The second high-level and low-level source voltages are AC voltages in the first period and are DC voltages in the second period.

19 Claims, 18 Drawing Sheets

DISPLAY APPARATUS FOR IMPROVING TOUCH NOISE

CROSS-REFERENCE TO RELATED APPLICATIONS

This application claims priority to Korean Patent Application No. 10-2024-0165376, filed in the Republic of Korea on Nov. 19, 2024, which is hereby expressly incorporated by reference as if fully set forth herein.

BACKGROUND

Field of the Invention

The present disclosure relates to a display apparatus for improving touch noise.

Discussion of the Related Art

As the thicknesses of display panels are reduced, parasitic capacitances between display electrodes and touch electrodes are increasing. A parasitic capacitor can be a path through which touch noise flows into a touch sensor. For example, a display driving voltage supplied to a display electrode can be recognized as noise in terms of a touch sensor, and a parasitic capacitor can be a path through which noise caused by the display driving voltage flows into the touch sensor. Touch noise flowing into the touch sensor can increase as the parasitic capacitance increases or as a pattern of the display driving voltage varies rapidly.

Recently, various attempts for reducing touch noise which can be caused by the display driving voltage are being performed, but there is a limitation in improving all of the level and uniformity of touch noise.

SUMMARY OF THE DISCLOSURE

To overcome the aforementioned limitations and other limitations of the related art, the present disclosure can provide a display apparatus which can improve the level and uniformity of touch noise which can be caused by a display driving voltage.

To achieve these objects and other advantages and in accordance with the purpose of the disclosure, as embodied and broadly described herein, a display apparatus includes a first display surface including first pixels connected to first data lines and configured to display first image data; a second display surface including second pixels connected to second data lines and configured to display second image data; a touch sensor array disposed to overlap the first display surface and the second display surface; a first gamma circuit configure to divide a first voltage difference between a first high-level source voltage and a first low-level source voltage to generate first gamma reference voltages for driving the first display surface; and a second gamma circuit configure to divide a second voltage difference between a second high-level source voltage and a second low-level source voltage to generate second gamma reference voltages for driving the second display surface, wherein one frame includes a first period and a second period succeeding the first period, wherein each of the first high-level source voltage and the first low-level source voltage is a direct current (DC) voltage in the first period and is an alternating current (AC) voltage in the second period, and wherein each of the second high-level source voltage and the second low-level source voltage is an AC voltage in the first period and is a DC voltage in the second period.

In another aspect of the present disclosure, a display apparatus includes a first display surface including first data lines and configured to display a first image; a second display surface including second data lines driven to be disconnected from the first data lines and configured to display a second image; and a touch sensor array disposed to overlap the first display surface and the second display surface, wherein one frame includes a first period and a second period succeeding the first period, wherein during the first period, first data voltages corresponding to the first image are supplied to the first data lines of the first display surface, and second compensation voltages, which may be unrelated to the second image and vary with a phase opposite to a phase of each of the first data voltages, are supplied to the second data lines of the second display surface, and wherein during the second period, second data voltages corresponding to the second image are supplied to the second data lines of the second display surface, and first compensation voltages, which may be unrelated to the first image and vary with a phase opposite to a phase of each of the second data voltages, are supplied to the first data lines of the first display surface.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE EMBODIMENTS

Figure 1:
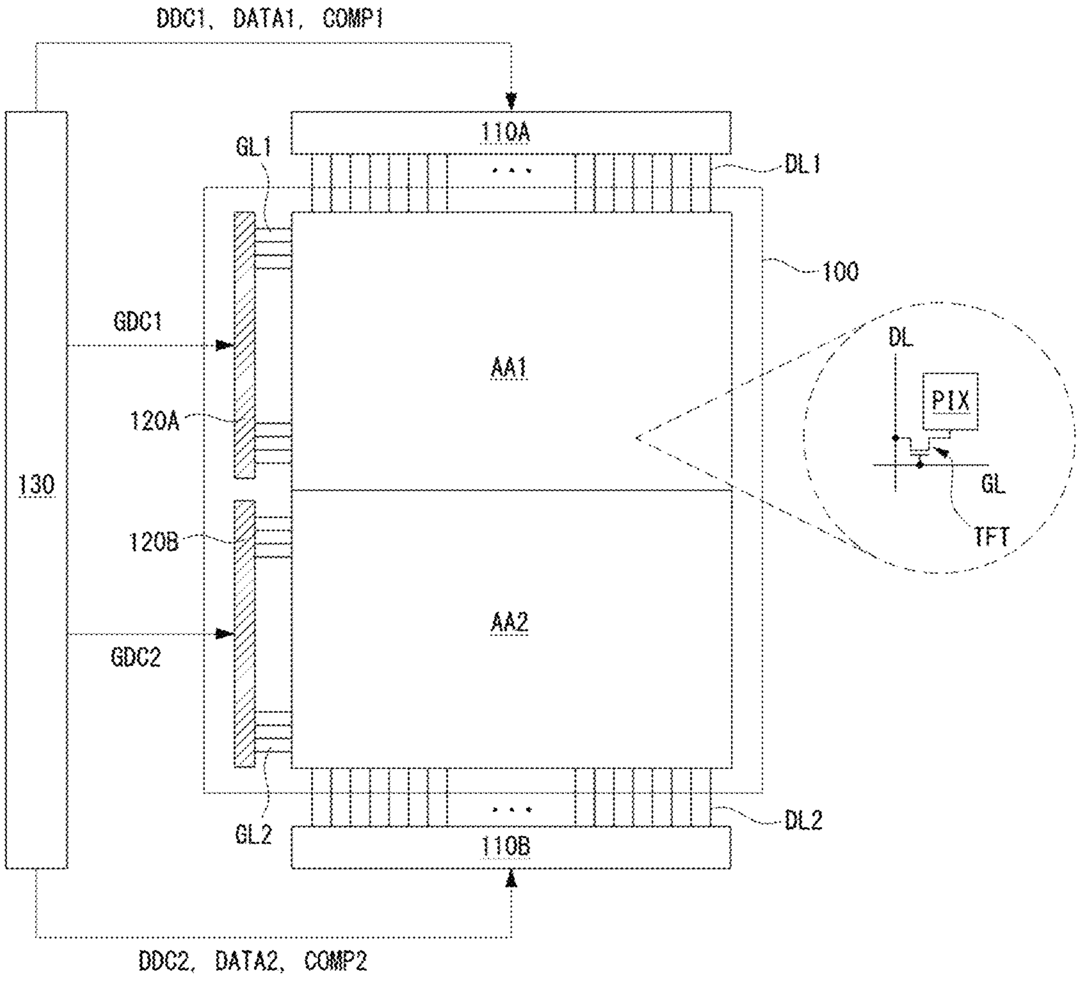
FIG. 1 is a diagram illustrating a display apparatus according to an embodiment of the present disclosure.

Hereinafter, the present disclosure will be described more fully with reference to the accompanying drawings, in which example embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely examples and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on", "over", "under", and "next", one or more other parts can be disposed between the two parts unless "just" or "direct" is used.

It will be understood that, although the terms such as "first", "second", etc. can be used herein to describe various elements, these elements should not be limited by these terms. These terms are only used to distinguish one element from another and may not define order or sequence. For example, a first element could be termed a second element, and, similarly, a second element could be termed a first element, without departing from the scope of the present disclosure. Further, the term "can" fully encompasses all the meanings and coverages of the term "may" and vice versa.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings. All the components of each display apparatus according to all embodiments of the present disclosure are operatively coupled and configured.

FIG. 1 is a diagram illustrating a display apparatus according to an embodiment of the present disclosure.

Referring to FIG. 1, the display apparatus according to an embodiment of the present disclosure can be an organic light emitting display apparatus. A display panel 100 of the display apparatus can include a screen which reproduces an input image. The screen can include a pixel array which displays pixel data (hereinafter referred to as "image data") DATA of an input image.

The screen can include a first display surface AA1 and a second display surface AA2 which are driven in a separated way. One side of the first display surface AA1 and one side of the second display surface AA2 can contact each other with a boundary therebetween. A first data driving circuit 110A can be disposed at the other side, which is opposite to the one side, of the first display surface AA1. A second data driving circuit 110B can be disposed at the other side, which is opposite to the one side, of the second display surface AA2.

The first display surface AA1 can include first data lines DL1, first gate lines GL1 intersecting the first data lines DL1, and first pixels PIX. The first pixels PIX can be arranged in the first display surface AA1 in a matrix type defined by intersections between the first data lines DL1 and the first gate lines GL1 to configure a first pixel array. The first pixels PIX can be arranged as various types such as a stripe type and a diamond type in the first display surface AA1, based on positions of the first pixels PIX emitting lights of the same color.

The second display surface AA2 can include second data lines DL2, second gate lines GL2 intersecting the second data lines DL2, and second pixels PIX. The second pixels PIX can be arranged in the second display surface AA2 in a matrix type defined by intersections between the second data lines DL2 and the second gate lines GL2 to configure a second pixel array. The second pixels PIX can be arranged as various types such as a stripe type and a diamond type in the second display surface AA2, based on positions of the second pixels PIX emitting lights of the same color.

The first display surface AA1 and the second display surface AA2 may not share the data lines DL1 and DL2, and moreover, may not share the gate lines GL1 and GL2. The first data lines DL1 disposed in the first display surface AA1 and the second data lines DL2 disposed in the second display surface AA2 can be physically and electrically disconnected from each other. Further, the first gate lines GL1 disposed in the first display surface AA1 and the second gate lines GL2 disposed in the second display surface AA2 can be physically and electrically disconnected from each other.

Pixels PIX included in the first display surface AA1 and the second display surface AA2 can include an R pixel which generates red (R) light, a G pixel which generates green (G) light, and a B pixel which generates blue (B) light, for various color combinations. The pixels PIX can further include a W pixel which generates white (W) light. The RGB pixels or the RGBW pixels can configure one unit pixel.

Each of the pixels PIX included in the first display surface AA1 and the second display surface AA2 can be implemented with a pixel circuit which is connected to a data line DL and a gate line GL through a thin film transistor (TFT). The pixel circuit can include a light emitting device, a driving transistor, one or more switch transistors, and a capacitor. The light emitting device can be implemented as an organic light emitting diode (OLED) where an organic compound layer is disposed between a cathode electrode and an anode electrode. A driving current applied to the light emitting device can be controlled based on a gate-source voltage of the driving transistor. The gate-source voltage of the driving transistor can be determined by a data voltage corresponding to image data DATA.

The pixel circuit can sample a threshold voltage of the driving transistor in the middle of a pixel programming operation which is performed in one frame period and can allow a sampled threshold voltage to be reflected in a gate-source voltage (hereinafter referred to as Vgs) of the driving transistor, and thus, can prevent a driving current from being distorted due to a threshold voltage variation of the driving transistor.

The pixel circuit can be implemented as a hybrid type. In a hybrid-type pixel circuit, semiconductor layers of some transistors can include low-temperature polycrystalline silicon (hereinafter referred to as LTPS), and semiconductor layers of the other transistors can be configured with oxide.

The timing controller 130 can receive first and second video data DATA1 and DATA2 and a timing signal, synchronized with the first and second video data DATA1 and DATA2, from a host system. The timing signal can include a vertical synchronization signal Vsync, a horizontal synchronization signal Hsync, a clock signal DCLK, and a data enable signal DE. The vertical synchronization signal Vsync can define a vertical period (i.e., one frame period). The horizontal synchronization signal Hsync can define a horizontal period (i.e., a period obtained by dividing one frame period by a vertical resolution). The data enable signal DE can define a time where the first and second video data DATA1 and DATA2 are transferred, in a vertical period or a horizontal period.

The timing controller 130 can generate a first source timing control signal DDC1 for controlling an operation timing of the first data driving circuit 110A and a first gate timing control signal GDC1 for controlling an operation timing of the first gate driving circuit 120A, based on the timing signal Vsync, Hsync, and DE received from the host system.

The timing controller 130 can generate a second source timing control signal DDC2 for controlling an operation timing of the second data driving circuit 110B and a second gate timing control signal GDC2 for controlling an operation timing of a second gate driving circuit 120B, based on the timing signal Vsync, Hsync, and DE received from the host system.

The timing controller 130 can temporally divide one frame into a first period and a second period and can control an operation of a display panel driving circuit by using timing control signals DDC1, DDC2, GDC1, and GDC2 so that an image is displayed only on the first display surface AA1 in the first period, and an image is displayed only on the second display surface AA2 in the second period.

To this end, the timing controller 130 can supply the display panel driving circuit with first timing control signals DDC1 and GDC1 and first image data DATA1 which is to be displayed on the first display surface AA1 in the first period and can supply the display panel driving circuit with second timing control signals DDC2 and GDC2 and second image data DATA2 which is to be displayed on the second display surface AA2 in the second period.

Moreover, the timing controller 130 can supply the display panel driving circuit with second timing control signals DDC2 and GDC2 and second compensation data COMP2 which is to be supplied to the second display surface AA2 in the first period and can supply the display panel driving circuit with first timing control signals DDC1 and GDC1 and first compensation data COMP1 which is to be supplied to the first display surface AA1 in the second period.

The timing controller 130 can analyze the first image data DATA1 which is to be displayed on the first display surface AA1 in the first period to generate the second compensation data COMP2 which is to be supplied to the second display surface AA2. The timing controller 130 can analyze the second image data DATA2 which is to be displayed on the second display surface AA2 in the second period to generate the first compensation data COMP1 which is to be supplied to the first display surface AA1.

The display panel driving circuit can be connected to the timing controller 130 through an interface circuit.

The display panel driving circuit can include a first data driving circuit 110A for driving the first display surface AA1 and a second data driving circuit 110B for driving the second display surface AA2.

The display panel driving circuit can further include a first gate driving circuit 120A for driving the first display surface AA1 and a second data driving circuit 110B and a second gate driving circuit 120B for driving the second display surface AA2.

The first data driving circuit 110A can drive first data lines DL1 of the first display surface AA1, and the first gate driving circuit 120A can drive first gate lines GL1 of the first display surface AA1. The second data driving circuit 110B can drive second data lines DL2 of the second display surface AA2, and the second gate driving circuit 120B can drive second gate lines GL2 of the second display surface AA2.

The first data driving circuit 110A can be implemented with a plurality of driving integrated circuits (ICs). The first data driving circuit 110A can be supplied with the first image data DATA1 and the first source timing control signal DDC1 from the timing controller 130 in the first period. The first data driving circuit 110A can generate first data voltages corresponding to the first image data DATA1 and can output the first data voltages to the first data lines DL1 in the first period, based on the first source timing control signal DDC1.

The first data driving circuit 110A can be supplied with the first compensation data COMP1 and the first source timing control signal DDC1 from the timing controller 130 in the second period. The first data driving circuit 110A can generate first compensation voltages corresponding to the first compensation data COMP1 and can output the first compensation voltages to the first data lines DL1 in the second period, based on the first source timing control signal DDC1.

The second data driving circuit 110B can be implemented with a plurality of driving ICs. The second data driving circuit 110B can be supplied with the second compensation data COMP2 and the second source timing control signal DDC2 from the timing controller 130 in the first period. The second data driving circuit 110B can generate second compensation voltages corresponding to the second compensation data COMP2 and can output the second compensation voltages to the second data lines DL2 in the first period, based on the second source timing control signal DDC2.

The second data driving circuit 110B can be supplied with the second image data DATA2 and the second source timing control signal DDC2 from the timing controller 130 in the second period. The second data driving circuit 110B can generate second data voltages corresponding to the second image data DATA2 and can output the second data voltages to the second data lines DL2 in the second period, based on the second source timing control signal DDC2.

The first gate driving circuit 120A and the second gate driving circuit 120B can be directly formed in a bezel region outside the screens AA1 and AA2 of the display panel 100.

The first gate driving circuit 120A can generate first gate signals of pulse type and can output the first gate signals to the first gate lines GL1 through line progressive scanning in the first period, based on the first gate timing control signal GDC1 supplied from the timing controller 130. The first gate signals of pulse type can include one or more scan signals and an emission control signal. The first gate driving circuit 120A can stop the outputs of the first gate signals of pulse type in the second period, based on the first gate timing control signal GDC1 supplied from the timing controller 130. As a result, the first gate lines GL1 can be scan-driven in a first direction in the first period, and in the second period, non-scan driving of the first gate lines GL1 can be performed.

The second gate driving circuit 120B can stop outputs of second gate signals of pulse type, based on the second gate timing control signal GDC2 supplied from the timing controller 130. The second gate signals of pulse type can include one or more scan signals and an emission control signal. The second gate driving circuit 120B can generate the second gate signals of pulse type and can output the second gate signals to the second gate lines GL2 through line progressive scanning in the first period, based on the second gate timing control signal GDC2 supplied from the timing controller 130. As a result, non-scan driving of the second gate lines GL2 can be performed in the first period, and the second gate lines GL2 can be scan-driven in a second direction opposite to the first direction.

Figure 2A:
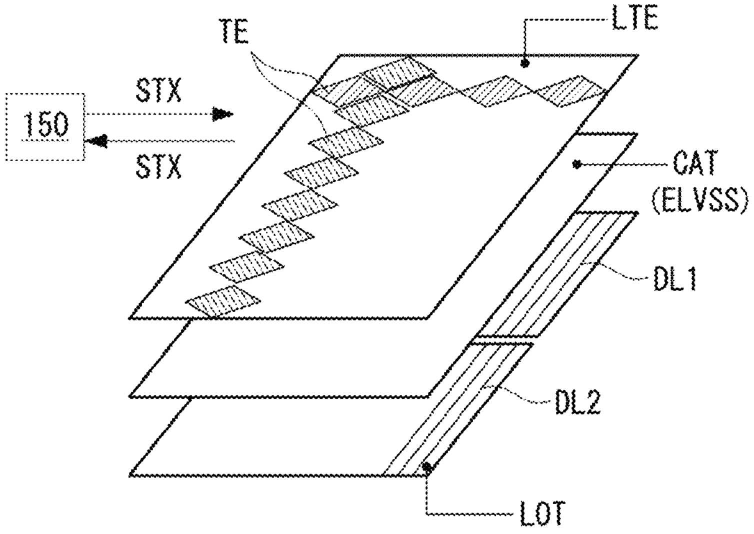
FIGS. 2A and 2B are diagrams illustrating an example where a touch electrode layer and a display electrode layer are coupled to each other through a cathode electrode layer.
Figure 2B:
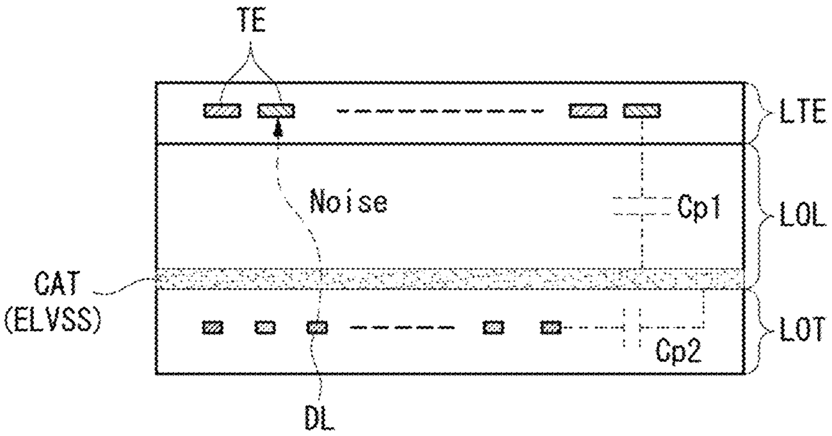

FIGS. 2A and 2B are diagrams illustrating an example where a touch electrode layer and a display electrode layer are coupled to each other through a cathode electrode layer according to one or more embodiments of the present disclosure.

In the display apparatus according to an embodiment of the present disclosure, a touch sensor array can be further disposed on the display panel 100. The touch sensors configuring the touch sensor array can be disposed in the screens AA1 and AA2 of the display panel 100 in an on-cell type or an add on type.

Referring to FIGS. 2A and 2B, the touch sensors can be implemented with touch electrodes TE included in a touch electrode layer LTE. The touch electrodes TE can be connected to a touch driving circuit 150 through touch routing lines. The touch driving circuit 150 can transfer a touch driving signal STX to the touch sensor and can receive a touch sensing signal SRX from the touch sensor.

The touch electrode layer LTE can be electrically coupled to a TFT layer LOT through a cathode electrode layer LOL. The cathode electrode layer LOL can be a common electrode layer which are shared by a first display surface AA1 and a second display surface AA2. The cathode electrode layer LOL can include a cathode electrode CAT connected to a low-level pixel power ELVSS.

A cathode electrode CAT can be coupled to the touch electrode TE through a first parasitic capacitor Cp1 and can be coupled to a data line DL through a second parasitic capacitor Cp2. Accordingly, display noise occurring in the touch electrode TE and the data line DL can flow into the touch sensor through the first and second parasitic capacitors Cp1 and Cp2. Each of the first and second parasitic capacitors Cp1 and Cp2 can be a noise inflow path.

Figure 3:
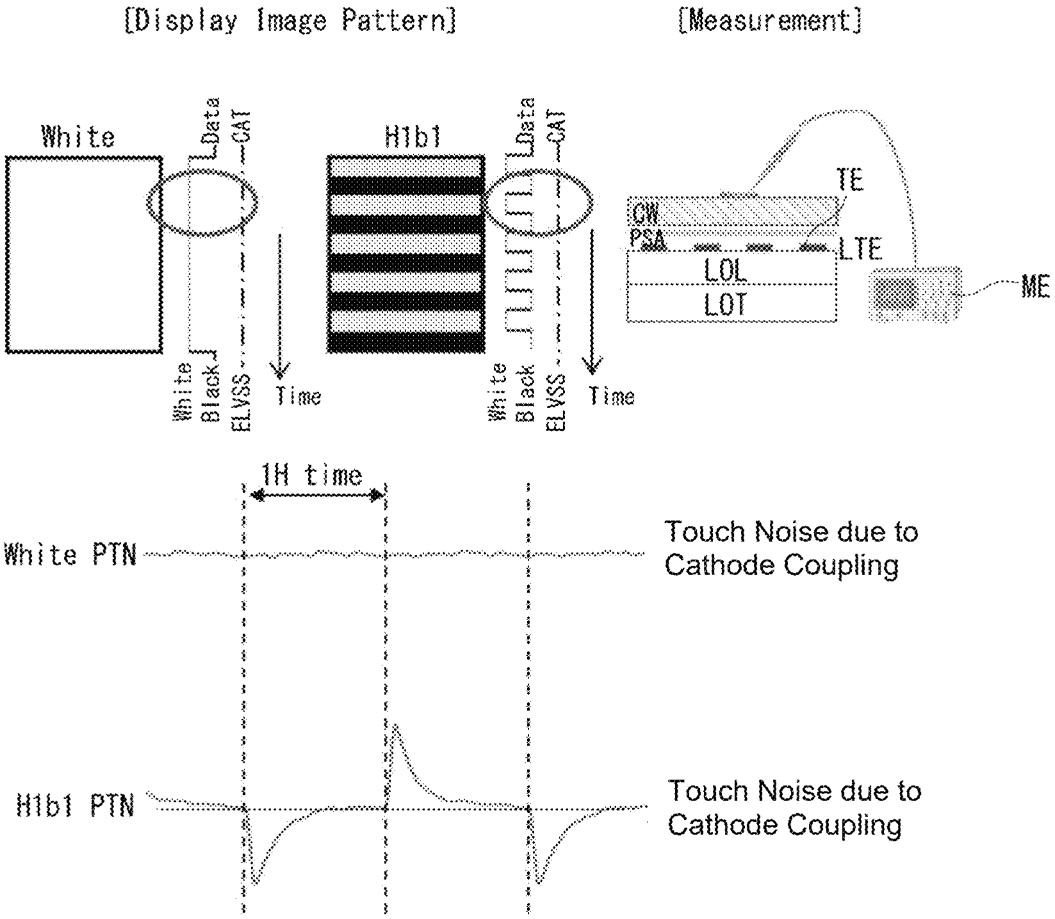
FIG. 3 is a diagram illustrating touch noise with respect to a display image pattern.

FIG. 3 is a diagram illustrating touch noise with respect to a display image pattern.

Referring to FIG. 3, in a display apparatus according to an embodiment of the present disclosure, a touch electrode layer LTE can be protected by a cover window CW attached thereto through an adhesive layer PSA. When a measurer ME measures noise in contact with one conductive pattern of the cover window CW, it can be seen that a magnitude of the noise flowing into the touch sensor is changed based on a display image pattern.

Display noise occurring in a data line DL can increase more in a white-black alternating pattern (Horizontal one by one, H1b1) than a white image pattern. Therefore, touch noise caused by cathode coupling can increase more in the white-black alternating pattern (Horizontal one by one, H1b1) than the white image pattern.

Figure 4:
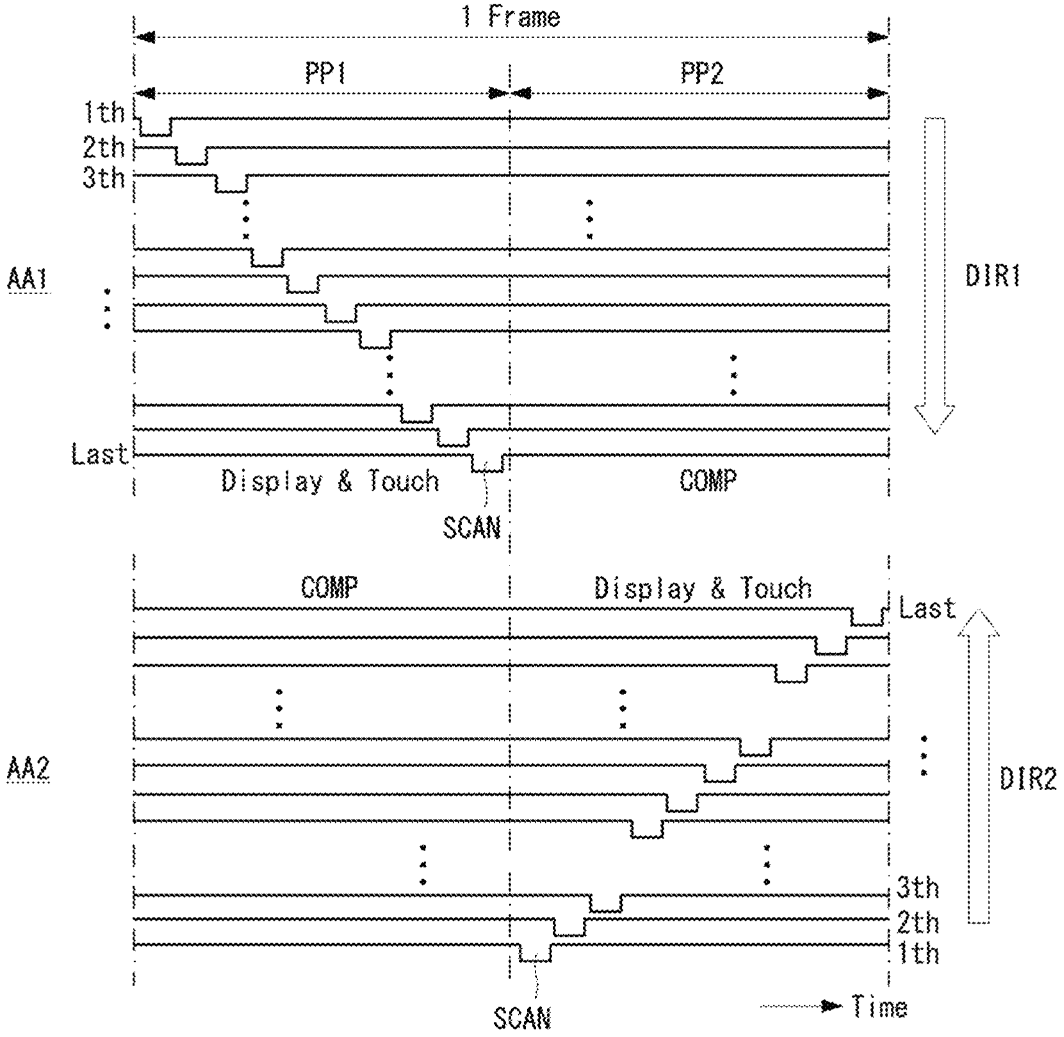
FIG. 4 is a diagram illustrating a driving and compensation timing of each of a first display surface and a second display surface of a display panel.
Figure 5A:
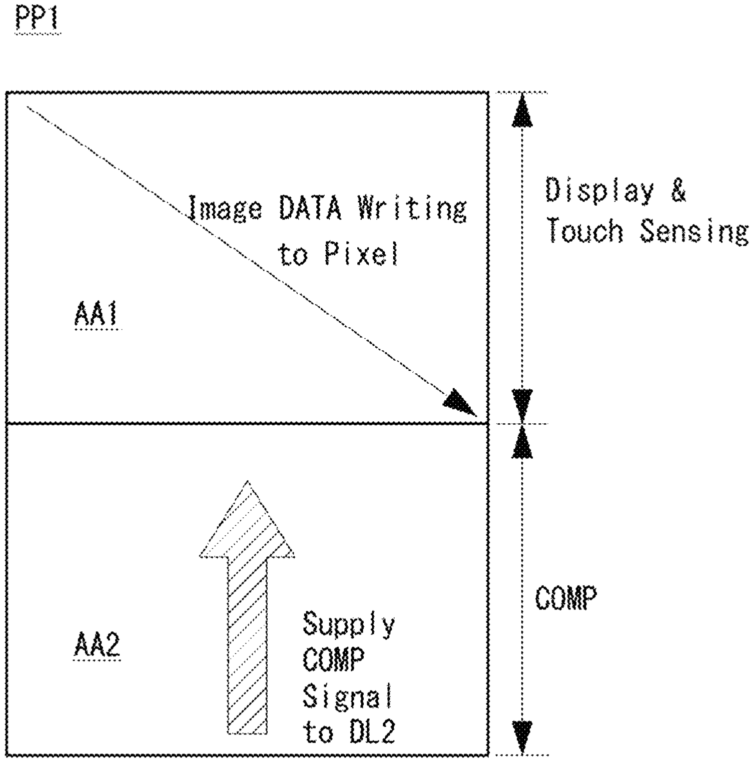
FIG. 5A is a diagram schematically illustrating operations of a first display surface and a second display surface in a first period of one frame.
Figure 5B:
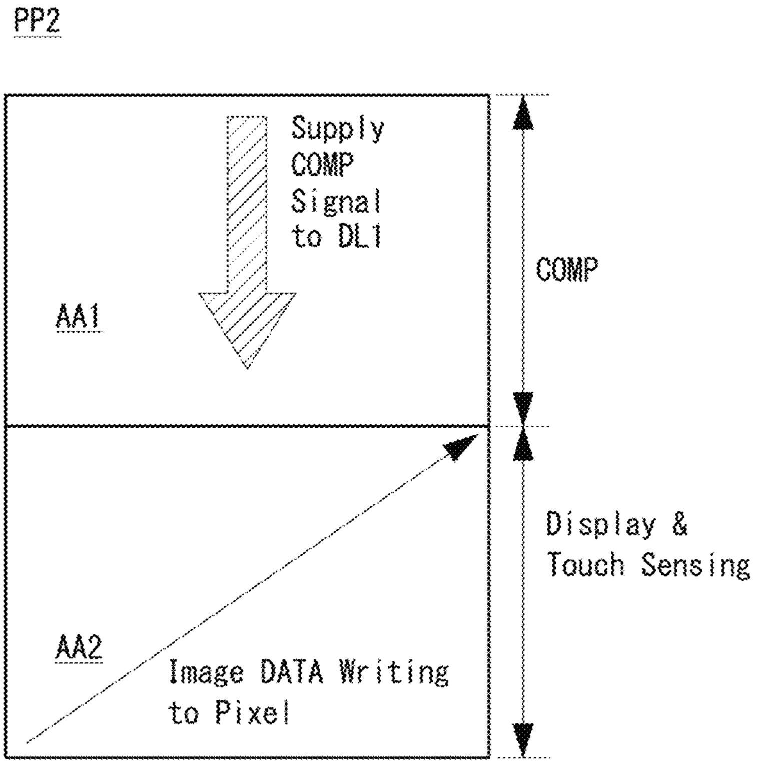
FIG. 5B is a diagram schematically illustrating operations of a first display surface and a second display surface in a second period of one frame.

FIG. 4 is a diagram illustrating a driving and compensation timing of each of a first display surface and a second display surface of a display panel. FIG. 5A is a diagram schematically illustrating operations of a first display surface and a second display surface in a first period of one frame. FIG. 5B is a diagram schematically illustrating operations of a first display surface and a second display surface in a second period of one frame.

Referring to FIG. 4, a first display surface AA1 and a second display surface AA2 of a display panel can alternately perform display & touch driving and compensation driving to be opposite to each other.

Referring to FIGS. 4 and 5A, the first display surface AA1 can perform display & touch driving in a first period PP1 of one frame. For display driving, first gate lines of the first display surface AA1 can be scan-driven in a first direction DIR1 through line progressive scanning, and first data voltages can be sequentially output to first data lines of the first display surface AA1 in a unit of one horizontal line, based on a scan driving timing. As a result, the first data voltages can be written in first pixels of the first display surface AA1, based on the scan driving timing. At this time, touch sensors of the first display surface AA1 can be driven for touch sensing, and thus, first touch sensing values can be obtained.

Compensation driving of the second display surface AA2 can be performed for improving touch noise included in the first touch sensing values in the first period PP1. For compensation driving, second gate lines of the second display surface AA2 can perform non-scan driving, and second compensation voltages COMP for offsetting noise can be sequentially output to the second data lines of the second display surface AA2 in a unit of one horizontal line. The second compensation voltages COMP can be merely output to the second data lines and may not be written in second pixels of the second display surface AA2. Based on non-scan driving of the second gate lines, the second pixels of the second display surface AA2 can be floated and can hold sufficient data voltages in a second period of a previous frame.

Referring to FIGS. 4 and 5B, the second display surface AA2 can perform display & touch driving in a second period PP2 of one frame. For display driving, second gate lines of the second display surface AA2 can be scan-driven in a second direction DIR2 opposite to the first direction DIR1 through line progressive scanning, and second data voltages can be sequentially output to second data lines of the second display surface AA2 in a unit of one horizontal line, based on a scan driving timing. As a result, the second data voltages can be written in second pixels of the second display surface AA2, based on the scan driving timing. At this time, touch sensors of the second display surface AA2 can be driven for touch sensing, and thus, second touch sensing values can be obtained.

Compensation driving of the first display surface AA1 can be performed for improving touch noise included in the second touch sensing values in the second period PP2. For compensation driving, first gate lines of the first display surface AA1 can perform non-scan driving, and first compensation voltages COMP for offsetting noise can be sequentially output to the first data lines of the first display surface AA1 in a unit of one horizontal line. The first compensation voltages COMP can be merely output to the first data lines and may not be written in first pixels of the first display surface AA1. Based on non-scan driving of the first gate lines, the first pixels of the first display surface AA1 can be floated and can hold sufficient first data voltages in the first period PP1.

Figure 6:
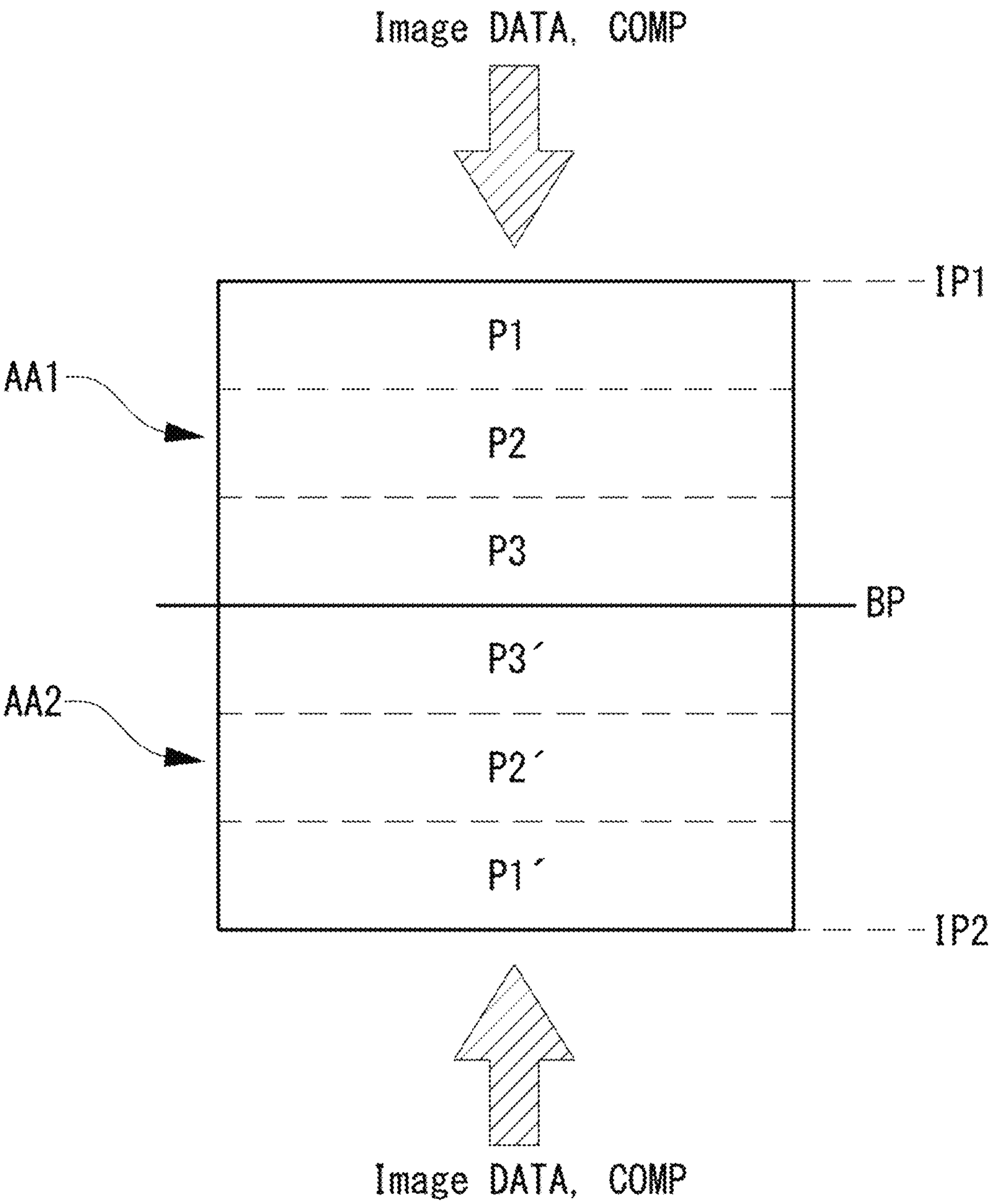
FIG. 6 is a diagram illustrating first to third positions of each of a first display surface and a second display surface.

FIG. 6 is a diagram illustrating first to third positions of each of a first display surface and a second display surface.

Referring to FIG. 6, in order to perform a position-based differential compensation, each of a first display surface AA1 and a second display surface AA2 can be divided into a plurality of positions. The first display surface AA1 can be divided into P1, P2, and P3 toward the second side BP from a first side IP1, and the second display surface AA2 can be divided into P1', P2', and P3' toward a second side BP from a first side IP2. Here, the inventive concept is not limited to the number of division positions in each display surface. The number of division positions can be provided in plurality.

Position-based differential compensation can be for increasing the uniformity of compensation. For example, in the first display surface AA1, the degree of compensation of P2 corresponding to a center portion can be greater than that of P1 and/or P3. Likewise, in the second display surface AA2, the degree of compensation of P2' corresponding to a center portion can be greater than that of P1 and/or P3.

Detailed content of position-based differential compensation will be additionally described in detail in the following embodiments of the present disclosure.

Figure 7:
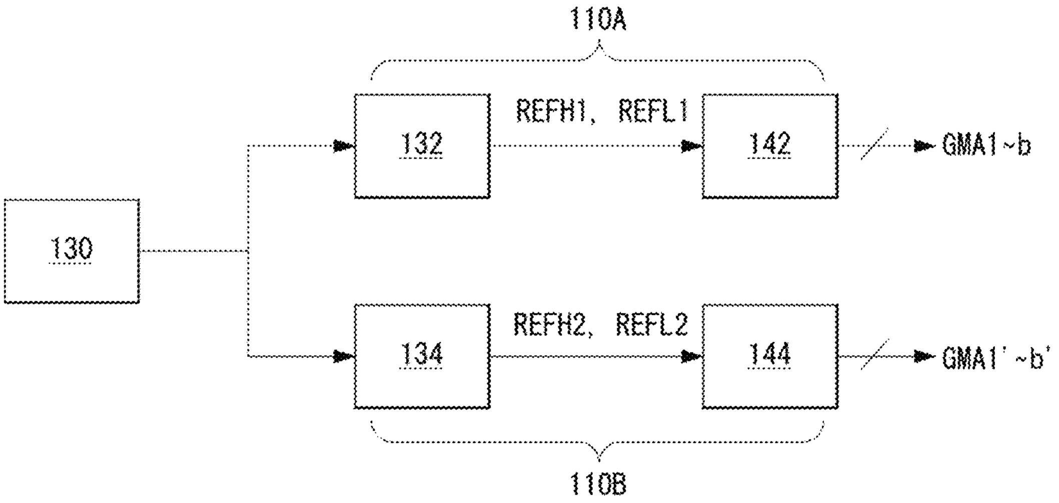
FIG. 7 is a diagram illustrating a connection configuration between a timing controller and first and second data driving circuits according to an embodiment of the present disclosure.
Figure 8:
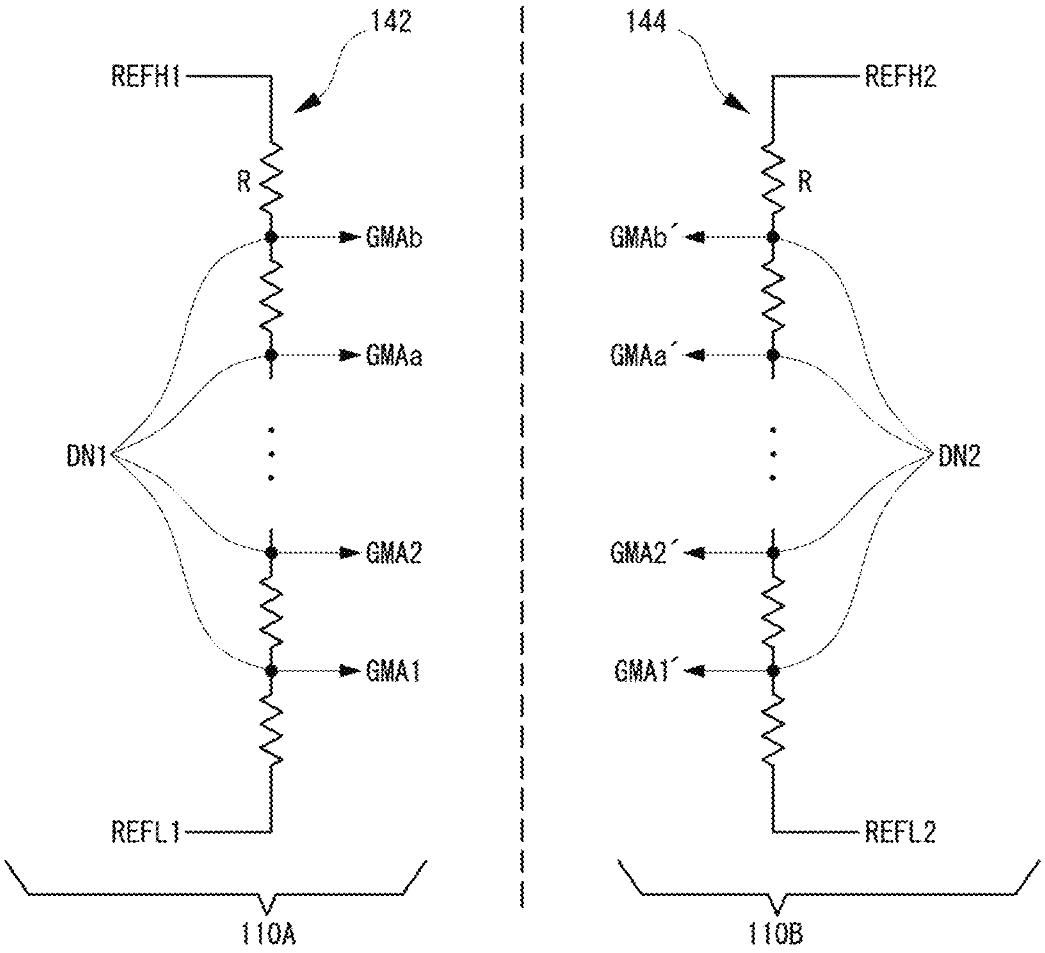
FIG. 8 is a diagram illustrating a first gamma circuit included in a first data driving circuit and a second gamma circuit included in a second data driving circuit.
Figure 9:
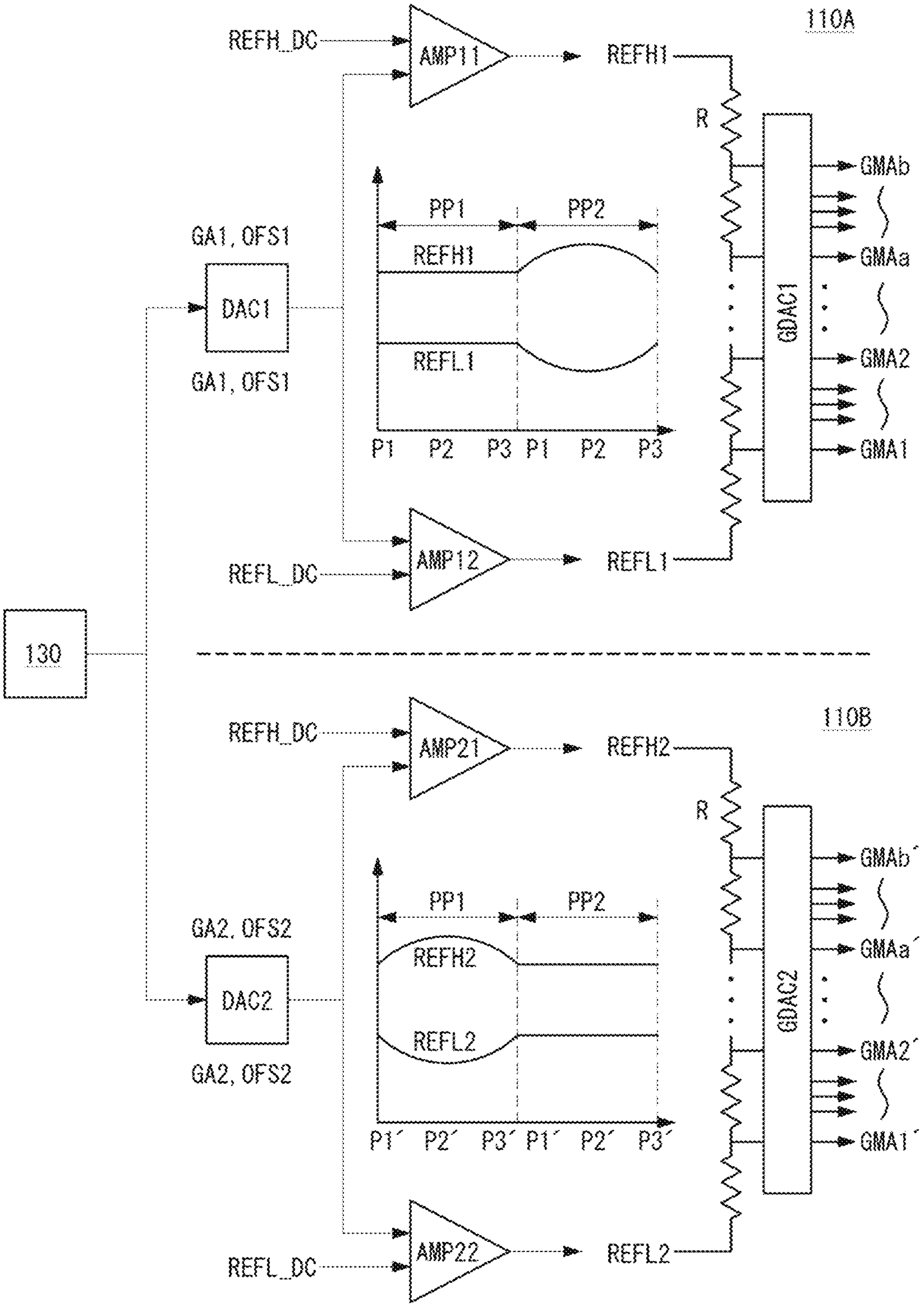
FIG. 9 is a diagram illustrating a connection configuration between a first power control circuit, a first gamma circuit, and a first voltage division circuit included in a first data driving circuit and a second power control circuit, a second gamma circuit, and a second voltage division circuit included in a second data driving circuit.

FIG. 7 is a diagram illustrating a connection configuration between a timing controller and first and second data driving circuits according to an embodiment of the present disclosure. FIG. 8 is a diagram illustrating a first gamma circuit included in a first data driving circuit and a second gamma circuit included in a second data driving circuit according to an embodiment of the present disclosure. FIG. 9 is a diagram illustrating a connection configuration between a first power control circuit, a first gamma circuit, and a first voltage division circuit included in a first data driving circuit and a second power control circuit, a second gamma circuit, and a second voltage division circuit included in a second data driving circuit. according to an embodiment of the present disclosure A display apparatus according to an embodiment of the present disclosure can analyze image data, for position-based differential compensation, and can control a gain and an offset of compensation data, based on an analysis result thereof. When the gain and offset of the compensation data are controlled, a voltage difference between a high-level source voltage and a low-level source voltage input to a gamma circuit can be differently controlled.

Referring to FIGS. 7 to 9, a first power control circuit 132 and a first gamma circuit 142 can be embedded in the first data driving circuit 110A, and a second power control circuit 134 and a second gamma circuit 144 can be embedded in the second data driving circuit 110B.

The timing controller 130 can analyze first image data which is to be supplied to a first display surface AA1 in a first period PP1 of one frame and can control a second gain GA2 and a second offset OFS2 of second compensation data which is to be supplied to a second display surface AA2, based on an analysis result thereof.

The timing controller 130 can analyze second image data which is to be supplied to the second display surface AA2 in a second period PP2 of one frame and can control a first gain GA1 and a first offset OFS1 of first compensation data which is to be supplied to the first display surface AA1, based on an analysis result thereof.

The first power control circuit 132 can include DAC1, AMP11, and AMP12.

The DAC1 can receive, from the timing controller 130, the first gain GA1 and the first offset OFS1 which vary over time in the second period PP2 and can digital-to-analog convert the first gain GA1 and the first offset OFS1 to supply to the AMP11 and the AMP12. The first gain GA1 and the first offset OFS1 may not be supplied to the AMP11 and the AMP12 in the first period PP1 and can be supplied to the AMP11 and the AMP12 in only the second period PP2.

The AMP11 and the AMP12 can output a first high-level source voltage REFH1 and a first low-level source voltage REFL1, which are driving powers of the first gamma circuit 142, as default direct current (DC) voltages REFH_DC and REFL_DC in the first period PP1. The AMP11 can reflect the first gain GA1 and the first offset OFS1, varying over time, in the default DC voltage REFH_DC in the second period PP2, and thus, can output the first high-level source voltage REFH1 as an alternating current (AC) voltage. The AMP12 can reflect the first gain GA1 and the first offset OFS1, varying over time, in the default DC voltage REFL_DC in the second period PP2, and thus, can output the first low-level source voltage REFL1 as an AC voltage.

Therefore, levels of the first high-level source voltage REFH1 and the first low-level source voltage REFL1 may not vary regardless of the positions P1, P2, and P3 of the first display surface AA1 in the first period PP1, and the levels of the first high-level source voltage REFH1 and the first low-level source voltage REFL1 can vary based on the positions P1, P2, and P3 of the first display surface AA1 in the second period PP2.

The second power control circuit 134 can include DAC2, AMP21, and AMP22.

The DAC2 can receive, from the timing controller 130, the second gain GA2 and the second offset OFS2 which vary over time in the first period PP1 and can digital-to-analog convert the second gain GA2 and the second offset OFS2 to supply to the AMP21 and the AMP22. The second gain GA2 and the second offset OFS2 may not be supplied to the second gain GA2 and the second offset OFS2 in the second period PP2 and can be supplied to the AMP21 and the AMP22 in only the first period PP1.

The AMP21 and the AMP22 can output a second high-level source voltage REFH2 and a second low-level source voltage REFL2, which are driving powers of the second gamma circuit 144, as the default DC voltages REFH_DC and REFL_DC in the second period PP2. The AMP21 can reflect the second gain GA2 and the second offset OFS2, varying over time, in the default DC voltage REFH_DC in the first period PP1, and thus, can output the second high-level source voltage REFH2 as an AC voltage. The AMP22 can reflect the second gain GA2 and the second offset OFS2, varying over time, in the default DC voltage REFL_DC in the first period PP1, and thus, can output the second low-level source voltage REFL2 as an AC voltage.

Therefore, levels of the second high-level source voltage REFH2 and the second low-level source voltage REFL2 can vary based on the positions P1', P2', and P3' of the second display surface AA2 in the first period PP1, and the levels of the second high-level source voltage REFH2 and the second low-level source voltage REFL2 may not vary regardless of the positions P1', P2', and P3' of the second display surface AA2 in the second period PP2.

The first gamma circuit 142 can divide a first voltage difference between the first high-level source voltage REFH1 and the first low-level source voltage REFL1 to generate first gamma reference voltages GMA1, GMA2 to GMAa, and GMAb needed for driving the first display surface AA1. To this end, the first gamma circuit 142 can include a first gamma resistor string connected between the first high-level source voltage REFH1 and the first low-level source voltage REFL1. In the first gamma resistor string, first voltage division nodes DN1 can be provided between adjacent resistors R, and voltages of the first voltage division nodes DN1 can be the first gamma reference voltages GMA1, GMA2 to GMAa, and GMAb.

A first voltage division circuit GDAC1 of the first gamma circuit 142 can further include a plurality of first resistor strings. The first voltage division circuit GDAC1 can further divide the first gamma reference voltages GMA1, GMA2 to GMAa, and GMAb to output first data voltages corresponding to first image data or first compensation voltages corresponding to first compensation data.

The second gamma circuit 144 can divide a second voltage difference between the second high-level source voltage REFH2 and the second low-level source voltage REFL2 to generate second gamma reference voltages GMA1', GMA2' to GMAa', and GMAb' needed for driving the second display surface AA2. To this end, the second gamma circuit 144 can include a second gamma resistor string connected between the second high-level source voltage REFH2 and the second low-level source voltage REFL2. In the second gamma resistor string, second voltage division nodes DN2 can be provided between adjacent resistors R, and voltages of the second voltage division nodes DN2 can be the second gamma reference voltages GMA1', GMA2' to GMAa', and GMAb'.

A second voltage division circuit GDAC2 of the second gamma circuit 144 can further include a plurality of second resistor strings. The second voltage division circuit GDAC2 can further divide the second gamma reference voltages GMA1', GMA2' to GMAa', and GMAb' to output second data voltages corresponding to second image data or second compensation voltages corresponding to second compensation data.

Figure 10A:
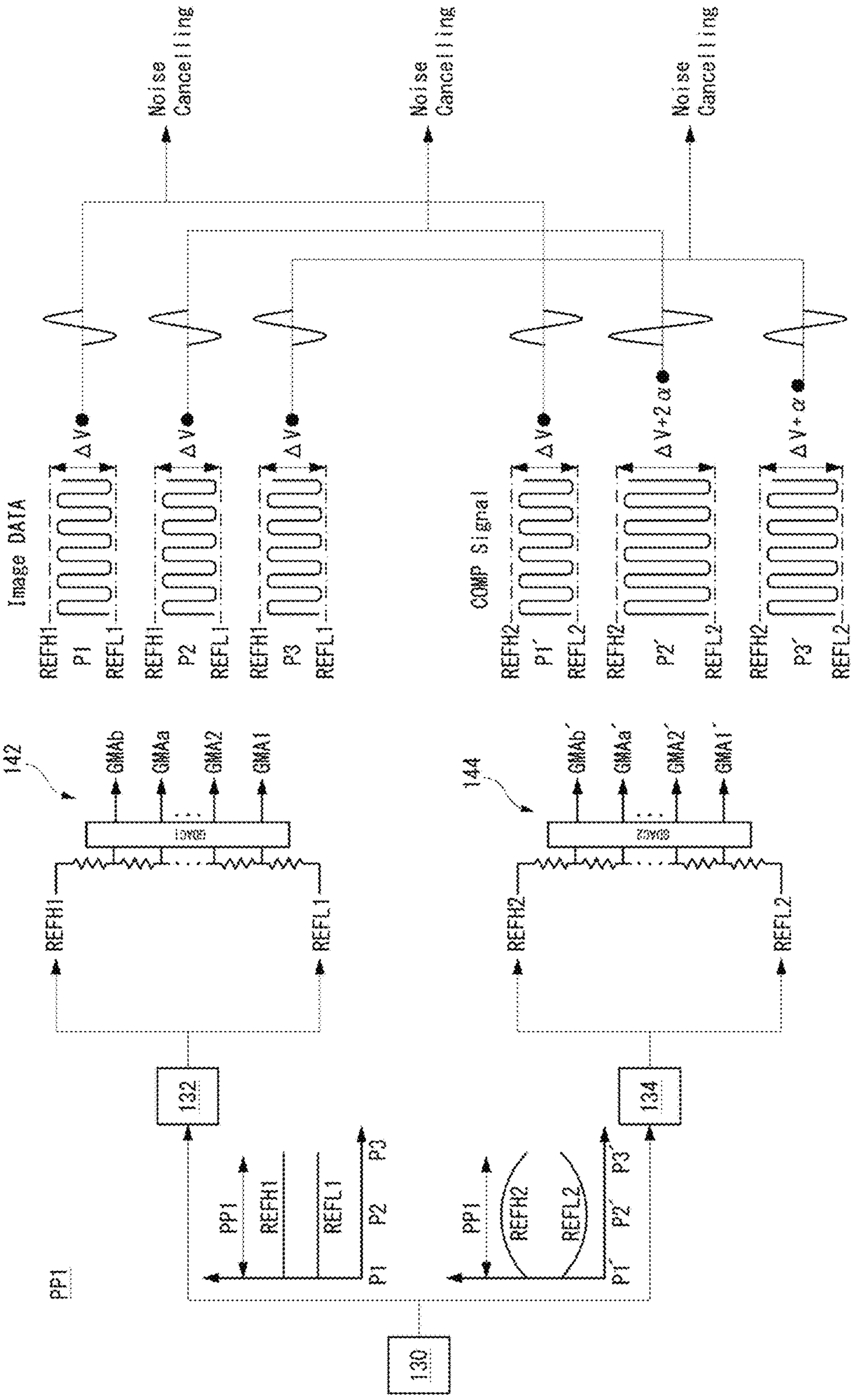
FIGS. 10A and 10B are diagrams illustrating in detail a detailed driving operation of each of a first display surface and a second display surface in a first period.
Figure 10B:
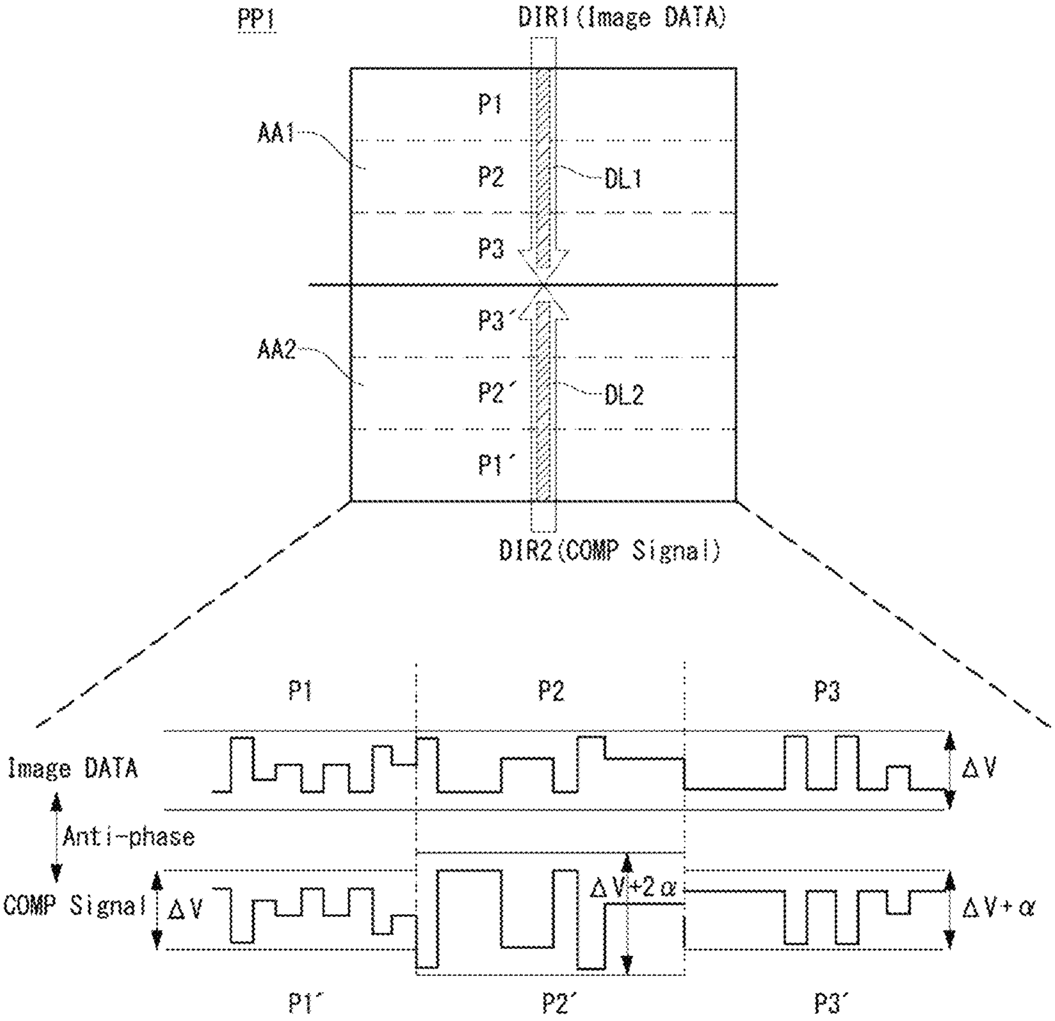

FIGS. 10A and 10B are diagrams illustrating in detail a detailed driving operation of each of a first display surface and a second display surface in a first period according to an embodiment of the present disclosure.

Referring to FIGS. 10A and 10B, in a first period PP1, a first high-level source voltage REFH1 and a first low-level source voltage REFL1 can be DC voltages where levels do not vary regardless of positions P1, P2, and P3 of a first display surface AA1, and a second high-level source voltage REFH2 and a second low-level source voltage REFL2 can each be AC voltages where levels vary based on positions P1', P2', and P3' of a second display surface AA2 (i.e., a level varies over time).

In the first period PP1, a first data driving circuit can generate first data voltages corresponding to first image data, based on first gamma reference voltages GMA1, GMA2 to GMAa, and GMAb obtained by dividing the DC voltages REFH1 and REFL1, and can output the first data voltages to first data lines. The first data voltages can vary with a first phase within a magnitude ΔV of a first voltage difference "REFH1−REFL1" between the DC voltages REFH1 and REFL1. The magnitude ΔV of the first voltage difference "REFH1−REFL1" for determining the first data voltages can be constant regardless of the positions P1, P2, and P3 of the first display surface AA1.

In the first period PP1, a second data driving circuit can generate second compensation voltages COMP corresponding to second compensation data, based on second gamma reference voltages GMA1', GMA2' to GMAa', and GMAb' obtained by dividing the AC voltages REFH2 and REFL2, and can output the second compensation voltages COMP to second data lines. The second compensation voltages COMP can vary with a second phase opposite to the first phase within a magnitude ΔV, ΔV+α, or ΔV+2α of a second voltage difference "REFH2−REFL2" between the AC voltages REFH2 and REFL2. The magnitude of the second voltage difference "REFH2−REFL2" for determining the second compensation voltages COMP can vary over time in the first period PP1 and can be relatively largest at a timing at which the second compensation voltages COMP are supplied to a center portion of the second display surface AA2, so as to improve the uniformity of touch noise. In other words, the magnitude of the second voltage difference "REFH2−REFL2" can be ΔV in P1' of the second display surface AA2, ΔV+2α in P2', or ΔV+α in P3'.

In the first period PP1, first display noise occurring due to variations of the first data voltages at the positions P1, P2, and P3 of the first display surface AA1 can be applied to a cathode electrode layer through a parasitic capacitor. Likewise, in the first period PP1, second display noise occurring due to variations of the second compensation voltages at the positions P1', P2', and P3' of the second display surface AA2 can be applied to the cathode electrode layer through the parasitic capacitor.

In the first period PP1, the first display noise and the second display noise can have opposite phases, and thus, can be offset with each other in the cathode electrode layer. Accordingly, the amount of display noise flowing into a touch electrode layer can be minimized or prevented.

In the first period PP1, because the first display surface AA1 and the second display surface AA2 are simultaneously driven per positions P1-P1', P2-P2', and P3-P3' corresponding to each other, display noises caused by a data variation can be offset per position, and thus, the level and uniformity of touch noise in an entire screen can be enhanced.

Figure 11A:
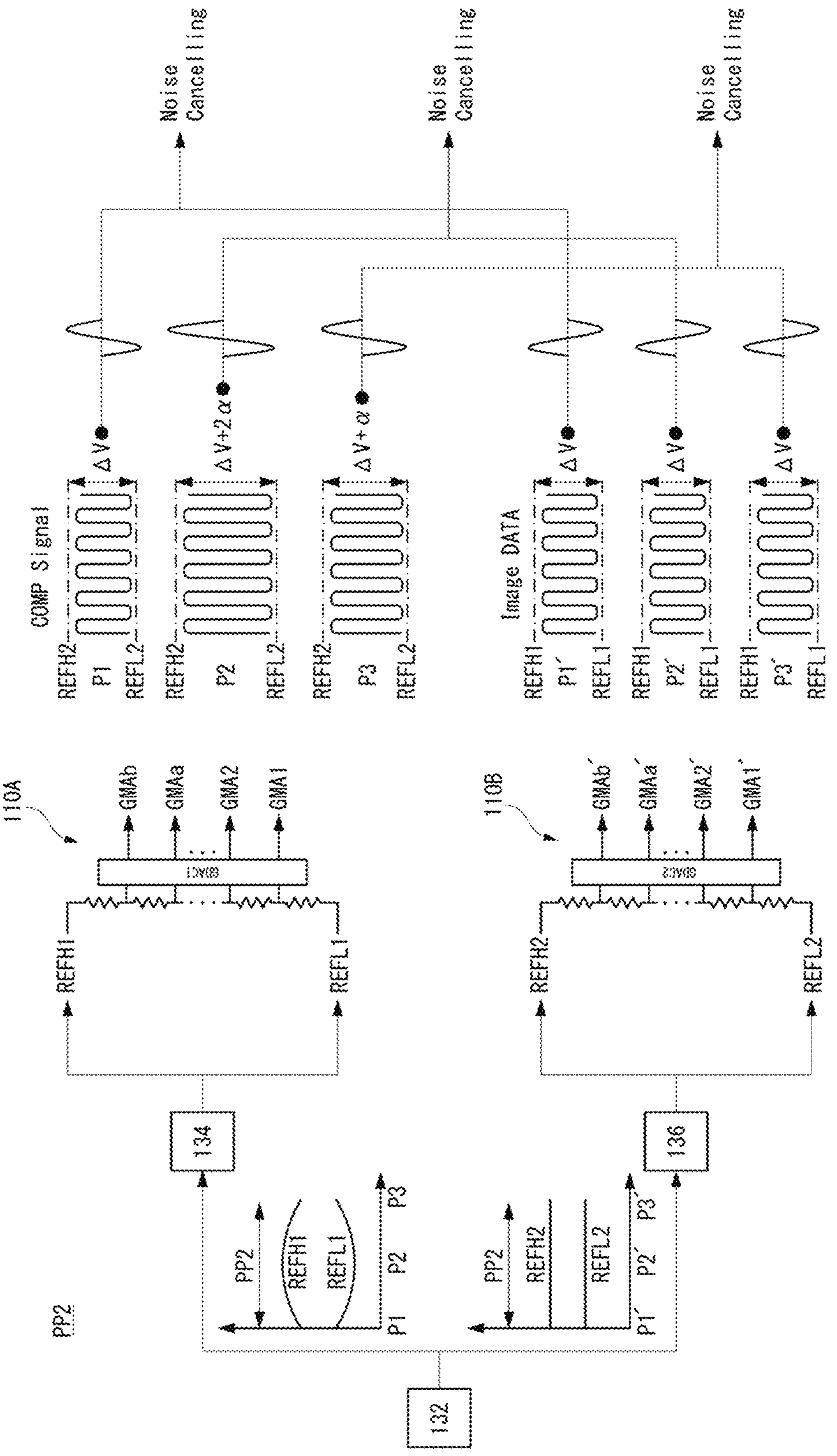
FIGS. 11A and 11B are diagrams illustrating in detail a detailed driving operation of each of a first display surface and a second display surface in a second period.
Figure 11B:
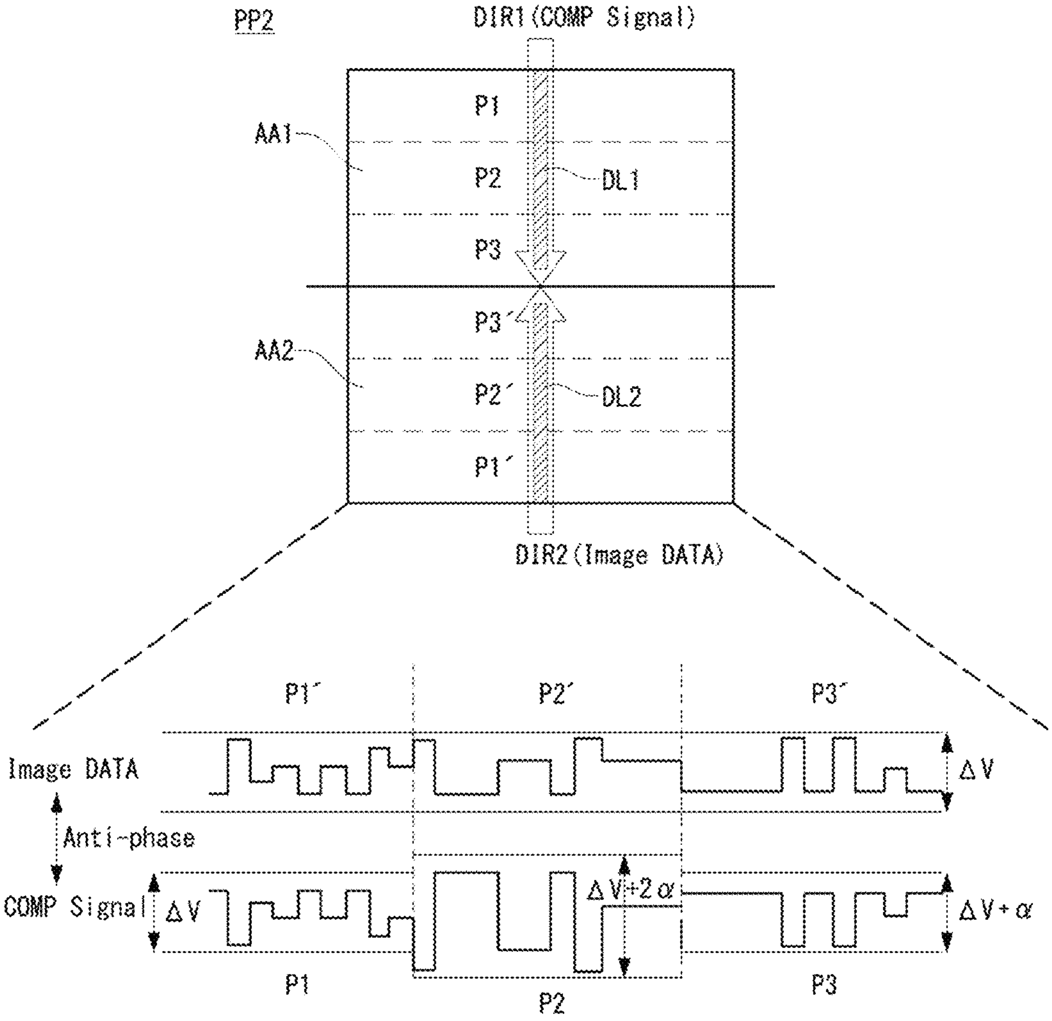

FIGS. 11A and 11B are diagrams illustrating in detail a detailed driving operation of each of a first display surface and a second display surface in a second period according to an embodiment of the present disclosure.

Referring to FIGS. 11A and 11B, in a second period PP2, a first high-level source voltage REFH1 and a first low-level source voltage REFL1 can each be an AC voltage where levels vary based on positions P1, P2, and P3 of a first display surface AA1 (i.e., a level varies over time), and a second high-level source voltage REFH2 and a second low-level source voltage REFL2 can DC voltages where levels do not vary regardless of positions P1', P2', and P3' of a second display surface AA2.

In the second period PP2, a second data driving circuit can generate second data voltages corresponding to second image data, based on first gamma reference voltages GMA1', GMA2' to GMAa', and GMAb' obtained by dividing the DC voltages REFH2 and REFL2, and can output the second data voltages to second data lines. The second data voltages can vary with a first phase within a magnitude ΔV of a second voltage difference "REFH2−REFL2" between the DC voltages REFH2 and REFL2.

In the second period PP2, a first data driving circuit can generate first compensation voltages COMP corresponding to first compensation data, based on first gamma reference voltages GMA1, GMA2 to GMAa, and GMAb obtained by dividing the AC voltages REFH1 and REFL1, and can output the first compensation voltages COMP to first data lines. The first compensation voltages COMP can vary with a second phase opposite to the first phase within a magnitude ΔV, ΔV+α, or ΔV+2α of a first voltage difference "REFH1−REFL1" between the AC voltages REFH1 and REFL1. The magnitude of the first voltage difference "REFH1−REFL1" for determining the first compensation voltages COMP can vary over time in the second period PP2 and can be relatively largest at a timing at which the first compensation voltages COMP are supplied to a center portion of the first display surface AA1, so as to improve the uniformity of touch noise. In other words, the magnitude of the first voltage difference "REFH1−REFL1" can be ΔV in P1 of the first display surface AA1, ΔV+α in P2, or ΔV+2α in P3.

In the second period PP2, first display noise occurring due to variations of the first compensation voltages at the positions P1, P2, and P3 of the first display surface AA1 can be applied to a cathode electrode layer through a parasitic capacitor. Likewise, in the second period PP2, second display noise occurring due to variations of the second data voltages at the positions P1', P2', and P3' of the second display surface AA2 can be applied to the cathode electrode layer through the parasitic capacitor.

In the second period PP2, the first display noise and the second display noise can have opposite phases, and thus, can be offset with each other in the cathode electrode layer. Accordingly, the amount of display noise flowing into a touch electrode layer can be minimized or prevented.

In the second period PP2, because the first display surface AA1 and the second display surface AA2 are simultaneously driven per positions P1-P1', P2-P2', and P3-P3' corresponding to each other, display noises caused by a data variation can be offset per position, and thus, the level and uniformity of touch noise in an entire screen can be enhanced.

Figure 12:
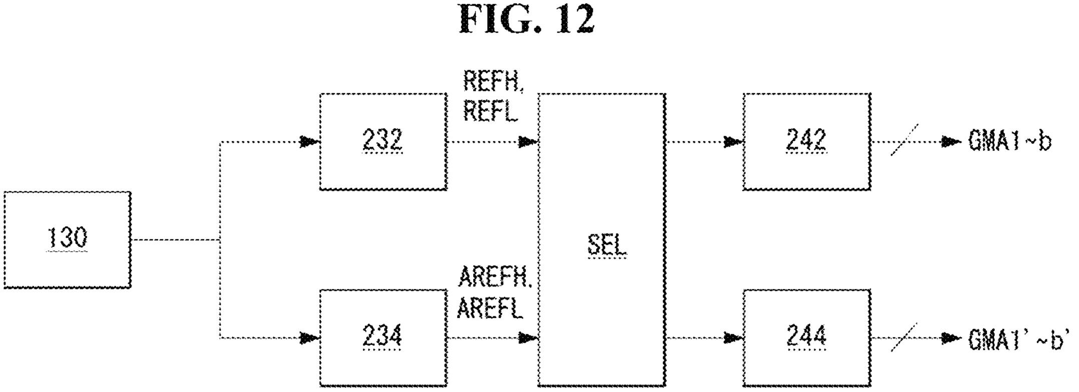
FIG. 12 is a diagram illustrating a connection configuration between a timing controller and first and second data driving circuits according to another embodiment of the present disclosure.
Figure 13:
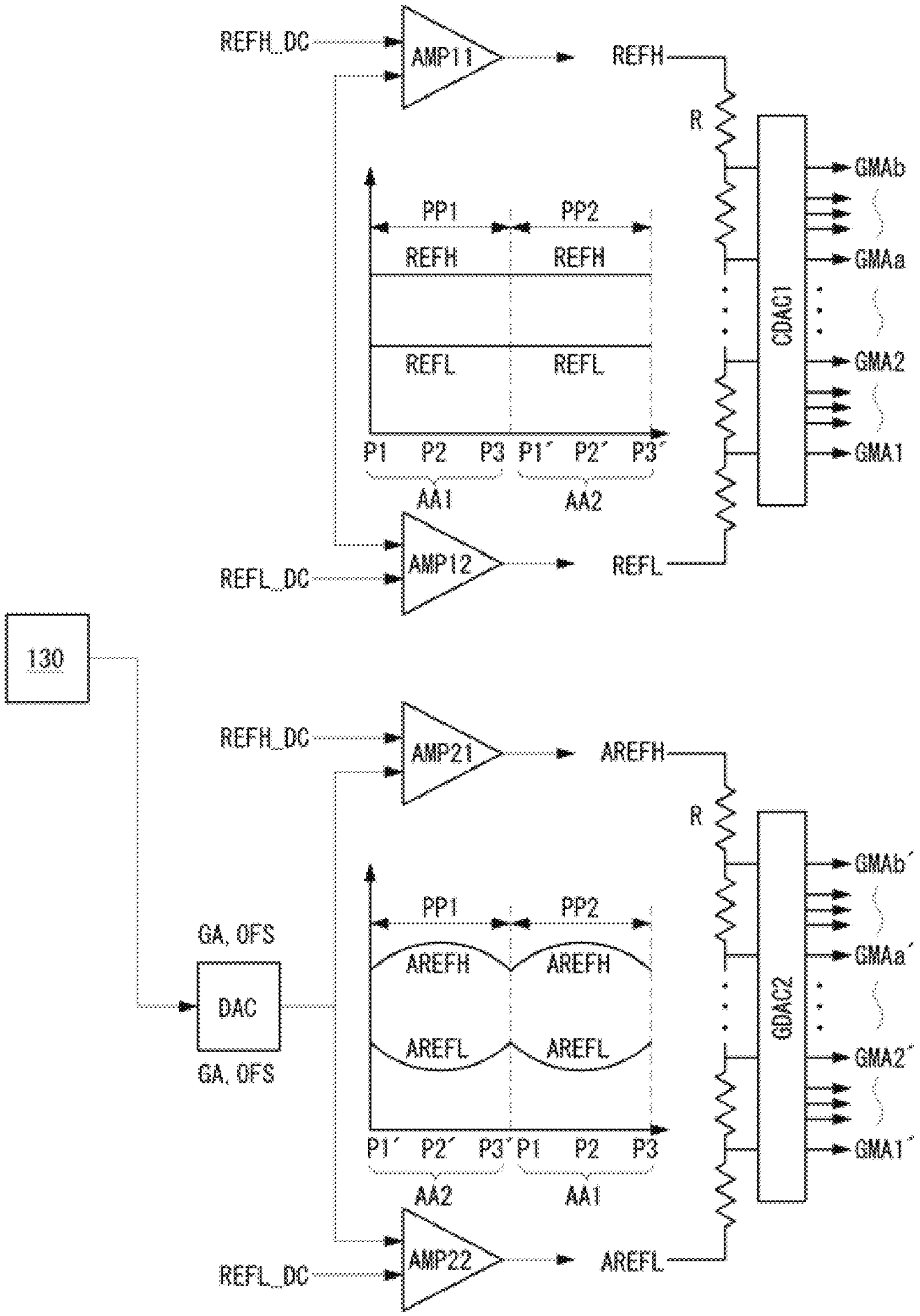
FIGS. 13, 14A, and 14B are diagrams illustrating a connection configuration between a first power generating circuit, a first gamma circuit, and a first voltage division circuit included in a first data driving circuit and a second power generating circuit, a second gamma circuit, and a second voltage division circuit included in a second data driving circuit.
Figure 14A:
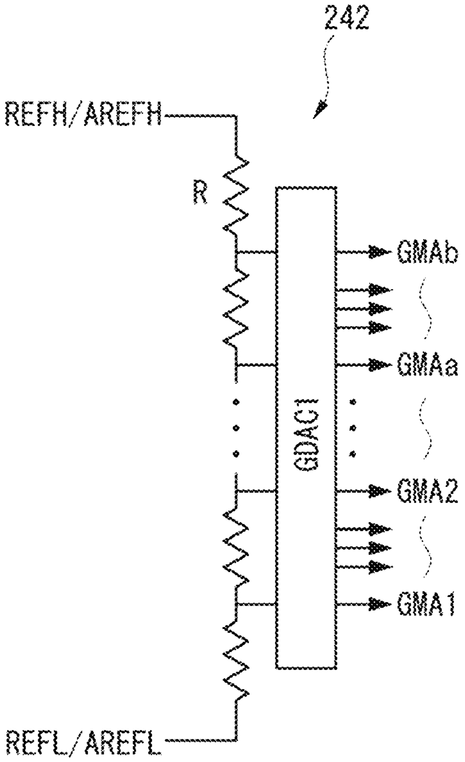
Figure 14B:
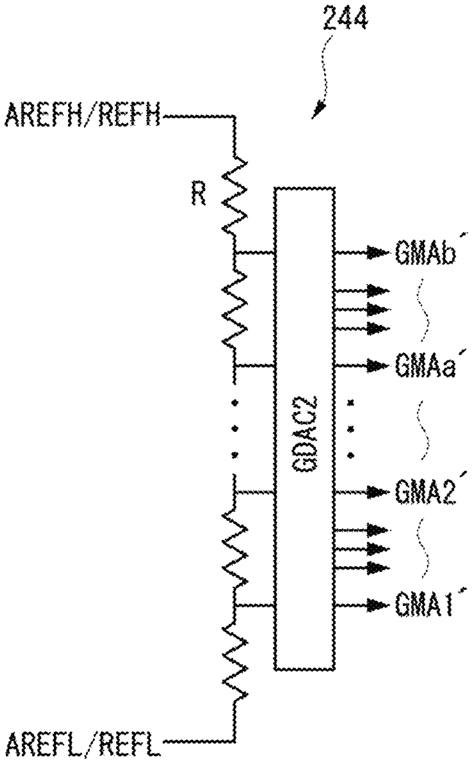

FIG. 12 is a diagram illustrating a connection configuration between a timing controller and first and second data driving circuits according to another embodiment of the present disclosure. FIGS. 13, 14A, and 14B are diagrams illustrating a connection configuration between a first power generating circuit, a first gamma circuit, and a first voltage division circuit included in a first data driving circuit and a second power generating circuit, a second gamma circuit, and a second voltage division circuit included in a second data driving circuit according to an embodiment of the present disclosure.

Referring to FIGS. 12 to 14B, in the present embodiment, the number of used DACs can decrease by one compared to the embodiment described above. The DAC may not be included in the first power generating circuit 232 and can be included in the second power generating circuit 234.

The timing controller 130 can analyze first image data which is to be supplied to the first display surface AA1 in the first period PP1 of one frame and can control a gain GA and an offset OFS of second compensation data which is to be supplied to the second display surface AA2, based on an analysis result thereof.

The timing controller 130 can analyze second image data which is to be supplied to the second display surface AA2 in the second period PP2 of one frame and can control a gain GA and an offset OFS of first compensation data which is to be supplied to the first display surface AA1, based on an analysis result thereof.

The first power generating circuit 232 can include the AMP11 and the AMP12, and thus, can generate a DC high-level source voltage REFH and a DC low-level source voltage REFL. The AMP11 and the AMP12 can output the DC high-level source voltage REFH and the DC low-level source voltage REFL as default DC voltages REFH_DC and REFL_DC in the first period PP1 and the second period PP2.

The second power generating circuit 234 can include the DAC, the AMP21, and the AMP22, and thus, can generate an AC high-level source voltage AREFH and an AC low-level source voltage AREFL. The DAC can receive, from the timing controller 130, a gain GA and an offset OFS varying over time in the first period PP1 and the second period PP2 and can digital-to-analog convert the gain GA and the offset OFS to supply to the AMP21 and the AMP22. The AMP21 and the AMP22 can reflect the gain GA and the offset OFS in the default DC voltage REFH_DC in the first period PP1, and thus, can output the AC high-level source voltage AREFH and the AC low-level source voltage AREFL.

The selection circuit SEL can alternately connect an output of the first power generating circuit 232 and an output of the second power generating circuit 234 to an input of the first gamma circuit 242 and can alternately connect the output of the first power generating circuit 232 and the output of the second power generating circuit 234 to an input of the second gamma circuit 244.

The selection circuit SEL can supply the DC high-level source voltage REFH and the DC low-level source voltage REFL to the first gamma circuit 242 in the first period PP1 and can supply the AC high-level source voltage AREFH and the AC low-level source voltage AREFL to the first gamma circuit 242 in the second period PP2. A detailed configuration of the first gamma circuit 242 can be substantially the same as FIG. 9, and thus, its description can be omitted.

On the other hand, the selection circuit SEL can supply the AC high-level source voltage AREFH and the AC low-level source voltage AREFL to the second gamma circuit 244 in the first period PP1 and can supply the DC high-level source voltage REFH and the DC low-level source voltage REFL to the second gamma circuit 244 in the second period PP2. A detailed configuration of the second gamma circuit 244 can be substantially the same as FIG. 9, and thus, its description can be omitted.

The present disclosure can improve the level and uniformity of touch noise caused by a display driving voltage.

The effects according to the present disclosure are not limited to the above examples, and other various effects can be included in the specification.

While the present disclosure has been particularly shown and described with reference to example embodiments thereof, it will be understood by those of ordinary skill in the art that various changes in form and details can be made therein without departing from the spirit and scope of the present disclosure as defined by the following claims.

What is claimed is:

1. A display apparatus comprising:

a first display surface including first pixels connected to first data lines and configured to display first image data;

a second display surface including second pixels connected to second data lines and configured to display second image data;

a touch sensor array disposed to overlap the first display surface and the second display surface;

a first gamma circuit configure to divide a first voltage difference between a first high-level source voltage and a first low-level source voltage to generate first gamma reference voltages for driving the first display surface; and a second gamma circuit configure to divide a second voltage difference between a second high-level source voltage and a second low-level source voltage to generate second gamma reference voltages for driving the second display surface, wherein one frame comprises a first period and a second period succeeding the first period, wherein each of the first high-level source voltage and the first low-level source voltage is a direct current (DC) voltage in the first period and is an alternating current (AC) voltage in the second period, and wherein each of the second high-level source voltage and the second low-level source voltage is an AC voltage in the first period and is a DC voltage in the second period.

2. The display apparatus of claim 1, wherein the first data lines are disconnected from the second data lines, and wherein the first pixels and the second pixels share a cathode electrode.

3. The display apparatus of claim 1, further comprising:

a first gate driving circuit configured to scan-drive first gate lines of the first display surface in a first direction in the first period, and non-scan drive the first gate lines in the second period; and a second gate driving circuit configured to non-scan drive second gate lines of the second display surface in the first period, and scan-drive the second gate lines in a second direction opposite to the first direction in the second period, wherein the first gamma circuit is included in a first data driving circuit connected to the first data lines, and wherein the second gamma circuit is included in a second data driving circuit connected to the second data lines.

4. The display apparatus of claim 3, wherein, during the first period, the first data driving circuit generates first data voltages corresponding to the first image data, based on first gamma reference voltages obtained by dividing the DC voltages, and outputs the first data voltages to first data lines, and the second data driving circuit generates second compensation voltages corresponding to second compensation data, based on second gamma reference voltages obtained by dividing the AC voltages, and outputs the second compensation voltages to the second data lines, and wherein, when the first data voltages vary with a first phase within a range of the first voltage difference which is the DC voltage, the second compensation voltages vary with a second phase opposite to the first phase within a range of the second voltage difference which is the AC voltage.

5. The display apparatus of claim 4, wherein a magnitude of the second voltage difference varies over time in the first period and is relatively largest at a timing at which the second compensation voltages are supplied to a center portion of the second display surface.

6. The display apparatus of claim 3, wherein, during the second period, the first data driving circuit generates first compensation voltages corresponding to first compensation data, based on first gamma reference voltages obtained by dividing the AC voltages, and outputs the first compensation voltages to the first data lines, and the second data driving circuit generates second data voltages corresponding to the second image data, based on second gamma reference voltages obtained by dividing the DC voltages, and outputs the second data voltages to the second data lines, and wherein, when the second data voltages vary with a first phase within a range of the second voltage difference which is the DC voltage, the first compensation voltages vary with a second phase opposite to the first phase within a range of the first voltage difference which is the AC voltage.

7. The display apparatus of claim 6, wherein a magnitude of the first voltage difference varies over time in the second period and is relatively largest at a timing at which the first compensation voltages are supplied to a center portion of the first display surface.

8. The display apparatus of claim 3, wherein the first data driving circuit further comprises:

a first power control circuit configured to generate the first high-level source voltage and the first low-level source voltage as DC voltages to supply the DC voltages to the first gamma circuit in the first period, and generate the first high-level source voltage and the first low-level source voltage as AC voltages varying over time to supply the AC voltages to the first gamma circuit in the second period; and a second power control circuit configured to generate the second high-level source voltage and the second low-level source voltage as AC voltages varying over time to supply the AC voltages to the second gamma circuit in the first period, and generate the second high-level source voltage and the second low-level source voltage as DC voltages to supply the DC voltages to the second gamma circuit in the second period.

9. The display apparatus of claim 3, wherein the first data driving circuit comprises:

a first power generating circuit configured to generate a high-level source voltage and a low-level source voltage as DC voltages;

a second power generating circuit configured to generate a high-level source voltage and a low-level source voltage as AC voltages varying over time; and a selection circuit configured to alternately connect an output of the first power generating circuit and an output of the second power generating circuit to an input of the first gamma circuit, and alternately connect the output of the first power generating circuit and the output of the second power generating circuit to an input of the second gamma circuit.

10. The display apparatus of claim 9, wherein the selection circuit supplies the DC voltages being the first high-level source voltage and the first low-level source voltage to the first gamma circuit in the first period, and supplies the AC voltages being the first high-level source voltage and the first low-level source voltage to the first gamma circuit in the second period, and wherein the selection circuit supplies the AC voltages being the second high-level source voltage and the second low-level source voltage to the second gamma circuit in the first period, and supplies the DC voltages being the second high-level source voltage and the second low-level source voltage to the second gamma circuit in the second period.

11. A display apparatus comprising:

a first display surface including first data lines and configured to display a first image;

a second display surface including second data lines driven to be disconnected from the first data lines, and configured to display a second image; and a touch sensor array disposed to overlap the first display surface and the second display surface, wherein a first period and a second period succeeding the first period are included in one frame, wherein, during the first period, first data voltages corresponding to the first image are supplied to the first data lines of the first display surface, and second compensation voltages, which vary with a phase opposite to a phase of each of the first data voltages, are supplied to the second data lines of the second display surface, and wherein, during the second period, second data voltages corresponding to the second image are supplied to the second data lines of the second display surface, and first compensation voltages, which vary with a phase opposite to a phase of each of the second data voltages, are supplied to the first data lines of the first display surface.

12. The display apparatus of claim 11, further comprising:

a first gamma circuit configure to divide a first voltage difference between a first high-level source voltage and a first low-level source voltage to generate first gamma reference voltages for generating the first data voltages and the first compensation voltages; and a second gamma circuit configure to divide a second voltage difference between a second high-level source voltage and a second low-level source voltage to generate second gamma reference voltages for generating the second data voltages and the second compensation voltages.

13. The display apparatus of claim 12, wherein the first display surface and the second display surface share a cathode electrode included in pixels.

14. The display apparatus of claim 12, further comprising:

a first gate driving circuit configured to scan-drive first gate lines of the first display surface in a first direction in the first period, and non-scan drive the first gate lines in the second period; and a second gate driving circuit configured to non-scan drive second gate lines of the second display surface in the first period, and scan-drive the second gate lines in a second direction opposite to the first direction in the second period.

15. The display apparatus of claim 14, wherein the first gamma circuit is included in a first data driving circuit connected to the first data lines, and wherein the second gamma circuit is included in a second data driving circuit connected to the second data lines.

16. The display apparatus of claim 15, wherein, during the first period, the first data driving circuit generates the first data voltages, based on first gamma reference voltages obtained by dividing DC voltages, and outputs the first data voltages to the first data lines, and the second data driving circuit generates the second compensation voltages, based on second gamma reference voltages obtained by dividing AC voltages, and outputs the second compensation voltages to the second data lines, and wherein, when the first data voltages vary with a first phase within a range of the first voltage difference which is the DC voltage, the second compensation voltages vary with a second phase opposite to the first phase within a range of the second voltage difference which is the AC voltage.

17. The display apparatus of claim 16, wherein a magnitude of the second voltage difference varies over time in the first period and is relatively largest at a timing at which the second compensation voltages are supplied to a center portion of the second display surface.

18. The display apparatus of claim 15, wherein, during the second period, the first data driving circuit generates the first compensation voltages, based on first gamma reference voltages obtained by dividing AC voltages, and outputs the first compensation voltages to the first data lines, and the second data driving circuit generates the second data voltages, based on second gamma reference voltages obtained by dividing DC voltages, and outputs the second data voltages to the second data lines, and wherein, when the second data voltages vary with a first phase within a range of the second voltage difference which is the DC voltage, the first compensation voltages vary with a second phase opposite to the first phase within a range of the first voltage difference which is the AC voltage.

19. The display apparatus of claim 18, wherein a magnitude of the first voltage difference varies over time in the second period and is relatively largest at a timing at which the first compensation voltages are supplied to a center portion of the first display surface.

* * * * *